Patented Apr. 28, 1925.

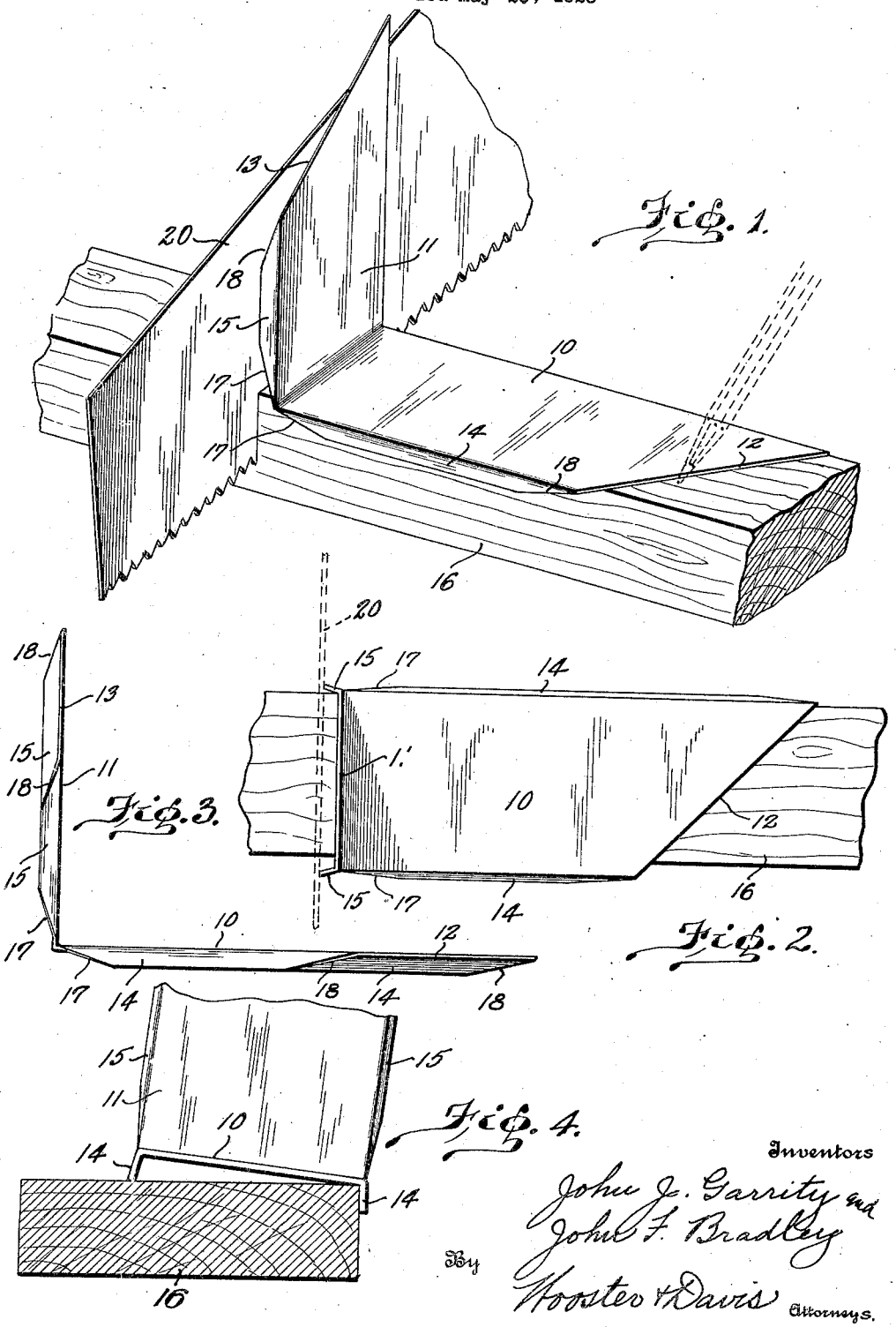

1,535,661

UNITED STATES PATENT OFFICE.

JOHN J. GARRITY AND JOHN F. BRADLEY, OF BRIDGEPORT, CONNECTICUT.

SAW GUIDE AND SQUARE.

Application filed May 23, 1923. Serial No. 640,397.

*To all whom it may concern:*

Be it known that we, JOHN J. GARRITY and JOHN F. BRADLEY, citizens of the United States, residing at Bridgeport, county of Fairfield, State of Connecticut, have invented a new and useful Saw Guide and Square, of which the following is a specification.

This invention relates to a carpenter's tool, and especially to a tool which may be used as a try-square and also as a saw guide.

It is an object of the invention to provide a device of this character which will be very simple in construction, and which may be used as a saw guide to facilitate sawing at right angles to the plane of the article and give a clean square cut.

With the foregoing and other objects in view, we have devised the construction illustrated in the accompanying drawing, in which Fig. 1 is a perspective view of the device indicating the mode of using the same;

Fig. 2 is a top plan view thereof;

Fig. 3 is a side elevation of the device; and

Fig. 4 is an end view of one leg of the device, the other leg being broken away.

The combined guide and square in the embodiment illustrated comprises a body having two portions 10 and 11 at right angles to each other but in different planes, and each portion is beveled at its end, as shown at 12 and 13, preferably at an angle of 45°, but of course other angles may be used if desired. Along the edges of both the body portions are flanges 14 and 15 respectively, and in both instances the flanges extend in a direction away from the other body portion. These flanges are preferably arranged at an angle to the body portion somewhat greater than 90° so that they are inclined outwardly as shown, but for certain classes of work they may be made at right angles to the body portion if desired. By inclining them outwardly they will rest flat along the edge of a piece of timber 16 which is of greater width than the width of the body portion, as shown in Fig. 4, and also if the guide is reversed a flange may be used as a saw guide longitudinally of the body portion without injuring the teeth of the saw.

The usual use of the device is shown in Figs. 1 and 2 where, by laying a flange along the edge of a timber 16, a line of 45° may be drawn at the beveled end if desired, but if it is desired to make a square cut the edges of the flanges 15 on the other portion 11 of the body may be used as a guide for the saw 20 as indicated. This guide makes it easy to cut a square cut both vertically and horizontally without the necessity of drawing a pencil line or placing the timber in a miter box. In order to prevent injury to the teeth of the saw the ends of the flanges 14 and 15 are undercut or beveled, as shown at 17. They are also undercut or beveled at their opposite ends, as shown at 18, for the same purpose should it be desired to use the beveled ends 12 and 13 as saw guides. The principle of the device may be carried out in different constructions, that shown being a single piece of steel.

It will be apparent from the foregoing description that the device is very simple in construction and has numerous uses. It will also be apparent that it is easily handled, making a very effective and convenient saw guide especially for making a square cut. It is much easier and more convenient to handle and use than the usual miter box, which is clumsy and more or less complicated. This article may be easily carried in the pocket or the tool-box of a workman.

Having thus described the nature of our invention, what we claim is:

1. A tool comprising a body having two portions arranged at an angle to each other in different planes, and flanges adjacent the lateral side edges of both said portions and extending longitudinally thereof, the flanges of each portion extending in a direction away from the other portion.

2. A tool comprising a body having two portions arranged at an angle to each other in different planes, and flanges adjacent the lateral side edges of both said portions and extending longitudinally thereof, the flanges of each portion extending in a direction away from the other portion to form saw guides and beveled at their ends to form spaces for the saw teeth.

3. A tool comprising a body having two portions arranged in planes at right angles to each other, the free ends of said portions being beveled at angles to the side edges, and flanges at the lateral side edges of both said body portions and extending longitudinally thereof, the flanges on each portion extending in a direction away from the other portion.

4. A tool comprising two portions in planes at right angles to each other with their free ends beveled at an angle to the side edges, flanges along the longitudinal edges of both the said portions and extending in directions away from the other portion to form saw guides, the flanges being beveled at their ends to provide clearance spaces for the teeth of the saw.

In testimony whereof we affix our signatures.

JOHN J. GARRITY.
JOHN F. BRADLEY.